United States Patent [19]
Richards et al.

[11] Patent Number: 5,191,427
[45] Date of Patent: Mar. 2, 1993

[54] VIDEO POST-PRODUCTION OF MATERIAL ACQUIRED ON FILM

[75] Inventors: John W. Richards, Chilbolton; Milan Krsljanin, Chineham, both of United Kingdom; Yoshio Ozaki, Tokyo, Japan

[73] Assignee: Sony Broadcast & Communications Limited, Basingstoke, England

[21] Appl. No.: 745,337

[22] Filed: Aug. 15, 1991

[30] Foreign Application Priority Data

Aug. 29, 1990 [GB] United Kingdom ............ 9018805
Jun. 5, 1991 [GB] United Kingdom ............ 9112077

[51] Int. Cl.$^5$ ............ H04N 3/36; H04N 5/253; H04N 7/01
[52] U.S. Cl. ............ 358/214; 358/140
[58] Field of Search ............ 358/214, 215, 216, 140, 358/54

[56] References Cited

U.S. PATENT DOCUMENTS

| | | |
|---|---|---|
| 4,338,634 | 7/1982 | Dillon et al. |
| 4,633,293 | 12/1986 | Powers. |
| 4,709,277 | 11/1987 | Ninomiya et al. ............ 358/140 |
| 4,881,125 | 11/1989 | Krause ............ 358/216 |
| 4,998,167 | 3/1991 | Jaqua ............ 358/140 |
| 4,998,287 | 3/1991 | Katznelson et al. ............ 358/214 |

FOREIGN PATENT DOCUMENTS 0440230 8/1991 European Pat. Off.
1-117480 5/1989 Japan.

OTHER PUBLICATIONS

RTM Rundfunktechnische Mitteilungen Jan. 1984, Hamburg, Dieter Poetsch "FDL 60–Ein System zur fortschrittlichen Filmabtastung" pp. 10–22 *pp. 14, 15; section 4.1, Filmformatumwandlung; FIG. 11*.

*Primary Examiner*—Michael T. Razavi
*Assistant Examiner*—Wendy R. Greening
*Attorney, Agent, or Firm*—Alvin Sinderbrand; William S. Frommer

[57] ABSTRACT

Apparatus for converting, for example, 24 Hz 1:1 format film to, for example, a 60 Hz 2:1 interlace format video signal comprises a converter (12) for transferring 24 Hz 1:1 format film material to a 60 Hz 2:1 interlace format video signal using 3 2 3 2 pull down, and a coder (13) associated with the converter (12) for associating a 10-field sequence identifier with the video signal. The 10-field sequence identifier is used to maintain identification of the phantom fields and the field sequence through subsequent processing, and in particular to control motion processing.

2 Claims, 6 Drawing Sheets

VIDEO POST-PRODUCTION OF MATERIAL ACQUIRED ON FILM

BACKGROUND OF THE INVENTION

1. Field of the Invention

This invention relates to video post-production of material acquired on film, and more particularly to the use of high-definition video equipment for the post-production of material acquired on movie film.

2. Description of the Prior Art

60 Hz, that is 60 fields per second, 2:1 interlace format high-definition video equipment is now well known and in widespread use. Despite this, movie film remains a very good way of acquiring material, even where the material is subsequently to be distributed in the form of high-definition video. This is not only because of the favourable rendition of material on film, but also due to the relative portability of film cameras compared with the current generation of high-definition video cameras, and also the ability of film cameras to produce good slow motion by acquisition at high frame rates.

Nevertheless, it is desirable to enable material acquired on film, normally at 24 Hz, but possible at 25 Hz or 30 Hz, to be post-produced using 60 Hz 2:1 interlace format high-definition video equipment, even in cases where the material may subsequently be transferred back to film for distribution. This is because there are many processes and effects which can readily be carried out on a video signal, for example, digital multi-effects, the integration into the film material of live video material, manipulation of the image, or even merely the simple addition of captions or titles, which are very expensive to do optically. Moreover, it may be desired to apply such processes and effects to material held in film archives.

FIG. 1 shows in block form a possible system for video post-production of material which has been acquired on film and is to be distributed on film or video. 24 Hz 1:1 format film material 1 is read by a telecine 2 to derive a 60 Hz (60 fields per second) 2:1 interlace format video signal. This may be done, for example, using 3 2 3 2 pull down, referred to in more detail below, and as currently used, for example in Japan and USA, for converting film material to a video signal. The video signal is supplied to a post-production unit 3 from which the modified video signal is supplied to an electron beam recorder system 4 for recording on film material 5 in a 24 Hz 1:1 format, for example using a drop field technique. The modified video signal may also be supplied to a video recorder 6 for recording in 60 Hz 2:1 interlace format.

It might be considered that the initial transfer from film to video could be done directly, in the sense that each frame of the film became a frame of video. Then, following post-production, each frame of video could be transferred directly back to a film frame. However, if this method were used then the video signal in the post-production unit 3 could not be viewed at real time speeds, because all action would be speeded up by a factor of 30/24. This would make it difficult to evaluate the aesthetic aspects of the program material during the post-production process. Moreover, the modified video signal could not be directly transferred to the video recorder 6 for distribution in video form. This possibility is not, therefore, a practical option.

The alternative is as indicated above in connection with FIG. 1, in which there is field repetition in the transfer from film to video. FIG. 2 illustrates the 3 2 3 2 pull down system, and shows the correspondence between film frames and video fields. This is shown for 24 Hz 1:1 format film transfer to 60 Hz (30 frames per second) 2:1 interlace format video. It will be seen that film frame 1 is used to form video fields 1, 2 and 3, video field 3 being a so-called phantom field because it is a repeat of video field 1. Film frame 2 is then used to form video fields 4 and 5. This gives an odd-even-odd-even-odd sequence of five video fields derived from the two film frames. To maintain the required odd/even alternation in the video fields, the 5-field sequence obtained then has to be repeated starting with an even field. Thus, film frame 3 is used to form video fields 6, 7 and 8, and film frame 4 is used to form video fields 9 and 10. In this case, video field 8 is the phantom field because it is a repeat of video field 6. Repetition of this 10-field sequence gives the required odd/even alternation.

This method produces correct speed of action during video post-production, although motion characteristics will be slightly jerky due to the phantom fields, that is the repeated video fields in each 5-field sequence. Although, as mentioned above, this 3 2 3 2 pull down method is commonly used for film to video transfer in USA and Japan, the motion portrayal is not strictly correct, although it is acceptable to viewers.

Video post-production equipment currently available is generally intended to operate on a video signal which is interlaced, that is a signal in which the two fields which compose a frame are equally separated in time from adjacent fields. Any post-production equipment that produces motion, such as special effects generators, or equipment which generates wipes or moving captions, therefore operates in such a way as to produce a regular motion across video fields. An example of this is shown for a switcher wipe in FIG. 3, where a wiping edge moves regularly across the picture from side to side. Fields 1 to 6 shown on the left correspond to fields 1 to 6 from FIG. 2; field 3 being one of the phantom fields in the 10-field sequence. The arrows in the centre of the figure indicate the fields selected for transfer to film, the image on which is indicated on the right of the figure. The areas within the concentric circles indicate a magnified view of the line structure derived from the video signal. The hatched areas in the images show the smear regions resulting from the composition into the same frame of video fields in which the motion of the wipe is different. It will also be noted that in particular due to dropping the phantom field, there is a sharp jump in the motion due to the dropped field. What has happened, is that there is now an incorrect temporal sequence as a result of dropping the phantom field, and so the motion is smeared.

SUMMARY OF THE INVENTION

One object of the present invention is to provide an improved method of film to video signal transfer.

Another object of the present invention is to provide a method of film to video signal transfer which permits correct motion rendition.

Another object of the present invention is to provide a method of film to video signal transfer with intermediate motion processing of the video signal, while retaining correct motion rendition.

Another object of the present invention is to provide apparatus for film to video signal transfer which overcomes the above-mentioned problems.

According to the present invention there is provided a method of film to video signal transfer involving the creation of phantom video fields, wherein a field sequence identifier is associated with said video signal to identify said phantom fields.

According to the present invention there is also provided a method of 24 Hz 1:1 format film to 60 Hz 2:1 interlace format video signal transfer using 3 2 3 2 pull down, wherein a 10-field sequence identifier is associated with said video signal.

According to the present invention there is also provided a method of 24 Hz 1:1 format film to 60 Hz 2:1 interlace video signal to 24 Hz 1:1 format film transfer comprises the steps of:

converting 24 Hz 1:1 format film material to a 60 Hz 2:1 interlace format video signal using 3 2 3 2 pull down;

associating a 10-field sequence identifier with said video signal, said 10-field sequence identifier indicating the phantom fields added during said pull down;

effecting motion processing of said video signal in dependence on said 10-field sequence identifier;

modifying said 10-field sequence identifier in dependence on processing delays occurring during motion processing of said video signal, to maintain correct indication of said phantom fields added during said pull down;

converting said video signal to 24 Hz 1:1 format, including dropping said phantom fields added during said pull down and indicated by said modified 10-field sequence identifier; and recording said converted video signal on film.

According to the present invention there is also provided apparatus for film to video signal transfer involving the creation of phantom video fields, the apparatus comprising means to associate a field sequence identifier with said video signal to identify said phantom fields.

According to the present invention there is also provided apparatus for converting 24 Hz 1:1 format film to a 60 Hz 2:1 interlace format video signal, the apparatus comprising:

conversion means for transferring 24 Hz 1:1 format film material to a 60 Hz 2:1 interlace format video signal using 3 2 3 2 pull down; and coding means associated with said conversion means for associating a 10-field sequence identifier with said video signal.

According to the present invention there is also provided apparatus for 24 Hz 1:1 format film to 60 Hz 2:1 interlace format video signal to 24 Hz 1:1 format film conversion, the apparatus comprising:

means for transferring 24 Hz 1:1 format film material to a 60 Hz 2:1 interlace format video signal using 3 2 3 2 pull down;

coding means for associating a 10-field sequence identifier with said video signal, said 10-field sequence identifier indicating the phantom fields added during said pull down;

a motion processor for effecting motion processing of said video signal in dependence on said 10-field sequence identifier;

means for modifying said 10-field sequence identifier in dependence on processing delays occurring during processing of said video signal, to maintain correct indication of said phantom fields added during said pull down;

conversion means for converting said processed video signal to 24 Hz 1:1 format, said conversion means dropping said phantom fields added during said pull down and indicated by said modified 10-field sequence identifier; and recording means for recording said converted video signal on film.

The above, and other objects, features and advantages of this invention will be apparent from the following detailed description of illustrative embodiments which is to be read in connection with the accompanying drawings.

DESCRIPTION OF THE PREFERRED EMBODIMENT

Before describing the embodiment, some further consideration of the matters discussed above may be helpful for a fuller understanding of the invention.

Where material acquired, for example, as a 24 Hz 1:1 format film has been transferred to 60 Hz 2:1 interlace format video, it needs to be understood that the video material derived is not identical as regards motion characteristics to material which is derived directly as 60 Hz 2:1 interlace format video. So far as the motion characteristics are concerned, they are dependent on the way in which the material was acquired initially, and hence in this example the motion characteristics are those of 24 Hz 1:1 format.

Figure 3:
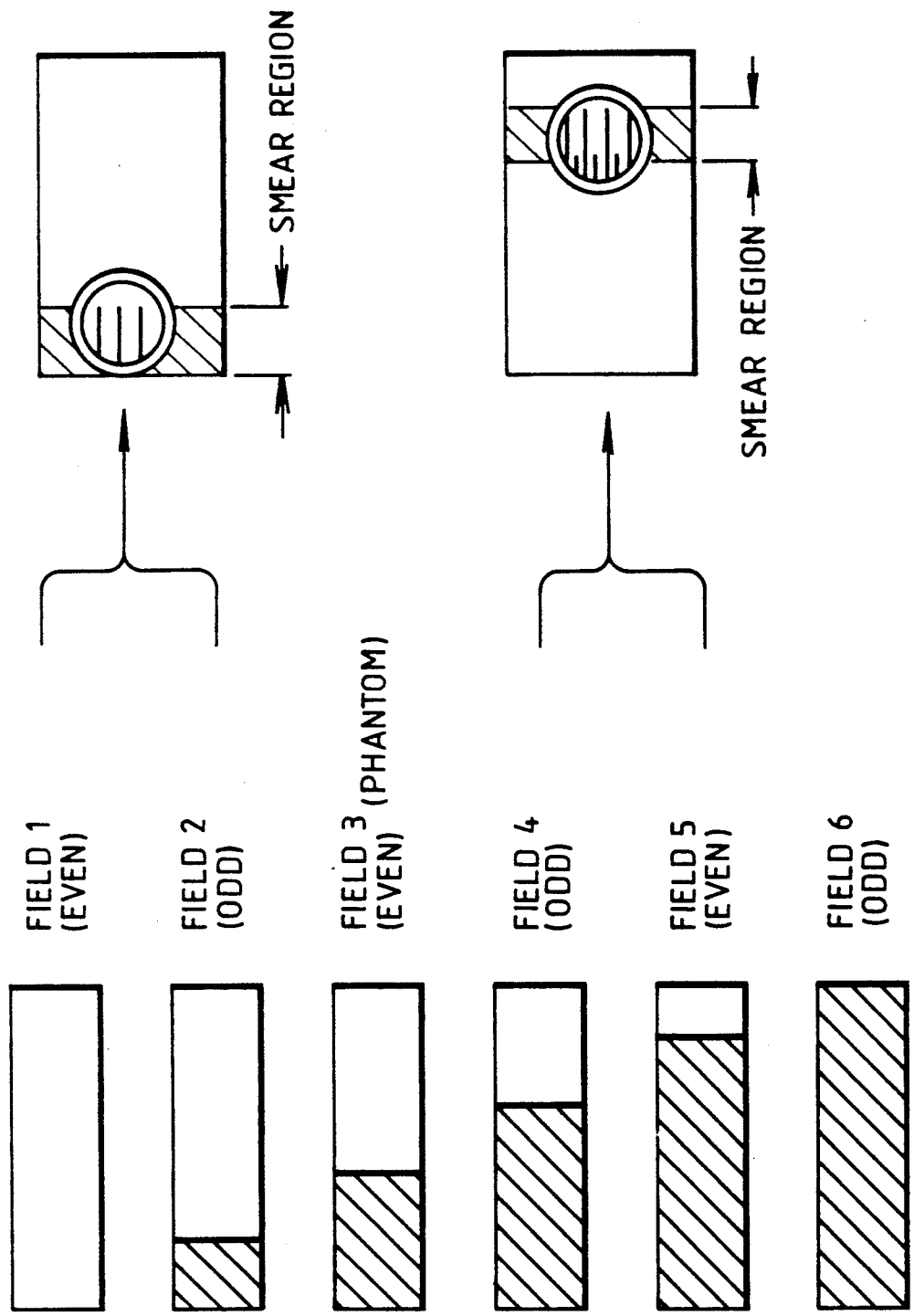
FIG. 3 shows video fields in a smooth horizontal switcher wipe and the resulting film image produced by dropping fields.

If then one considers, for example, the case where some additional motion has been put into the material, for example the switcher wipe illustrated in FIG. 3, then it needs to be understood that the resulting picture in fact incorporates two motions. Firstly, there is the motion derived from the original material, which was acquired in a progressive format, that is with a regular time difference between fields. Secondly, there is any motion introduced electronically by manipulation of the video signal. It could be said, therefore, that what is required is to give these two motions the same movement characteristics, in order to avoid unnatural effects in the final material. When manipulating the video signal, therefore, any motion introduced must be modified to take account of the temporal positions of the input and output sequences of fields of frames.

Put very simply, this is done by relating the video fields to the film frames. In more detail, what this means is that in the case described above where film frames are converted to video fields by a 3 2 3 2 pull down which creates a 10-field sequence containing two phantom fields, these phantom fields must tracked, and also account must be taken of their temporal positions all through the post-production equipment, so that correct motion is introduced, and, when the material is converted back to 24 Hz, it is the phantom fields which are dropped, and the motion is the same for the two fields which are to form a frame.

This identification can be done in a variety of different ways. For example, the 10-field sequence can be identified by modulo-10 coding the video time code, by auxiliary data inserted into the video signal itself, for example by marking a specific line or inserting data in a specific line in the blanking interval of each field, or by using some other auxiliary signal, such as time code user bits or video indexing. This marking of the 10-field sequence is done at the time that the film material is transferred to video and is maintained thereafter up to the point where the phantom fields are dropped.

All circuitry in the post-production unit which introduces motion into the video signal, such as switchers, digital multi-effects equipment, rolling caption generators, special effects generators and so on, incorporate means to decode the 10-field video sequence identifier, so as to control their own operation. Other circuitry carries forward the 10-field video sequence identifier, and any circuit which introduces a delay effects any necessary compensating delay in the 10-field video sequence identifier.

Figure 2:
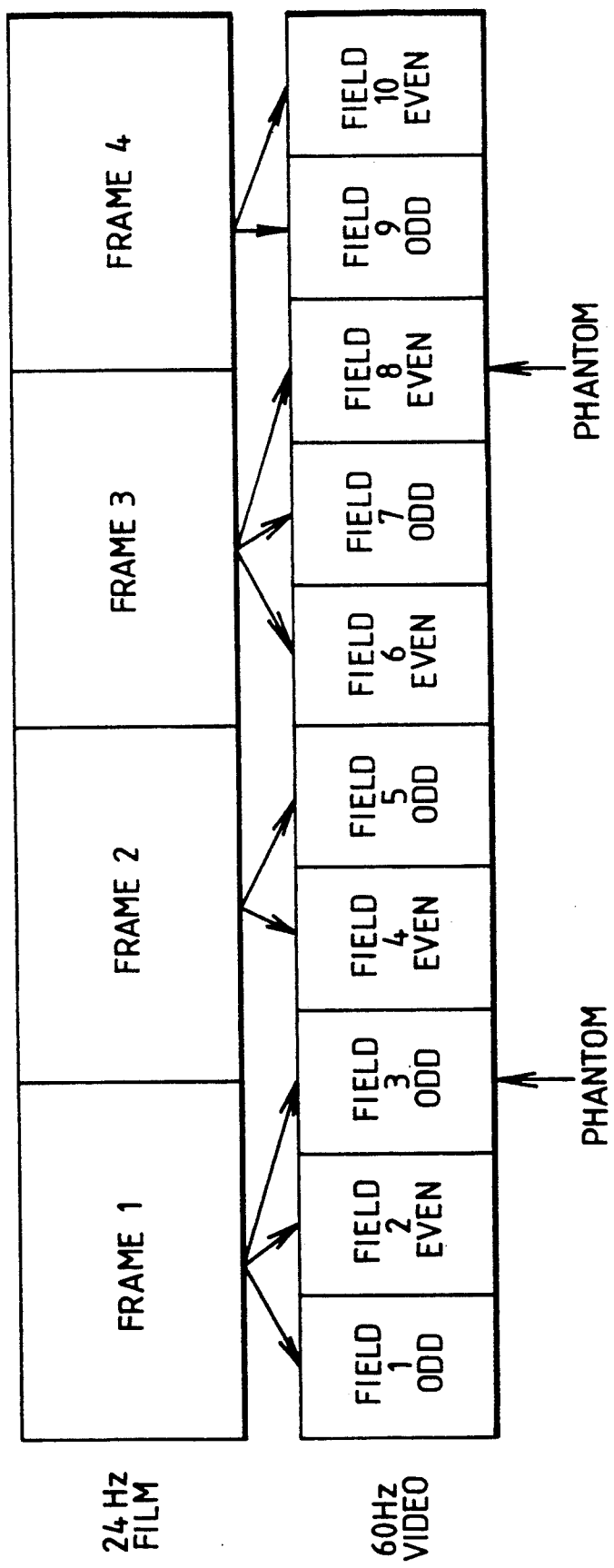
FIG. 2 shows a 10-field video sequence produced by 3 2 3 2 pull down.
Figure 4:
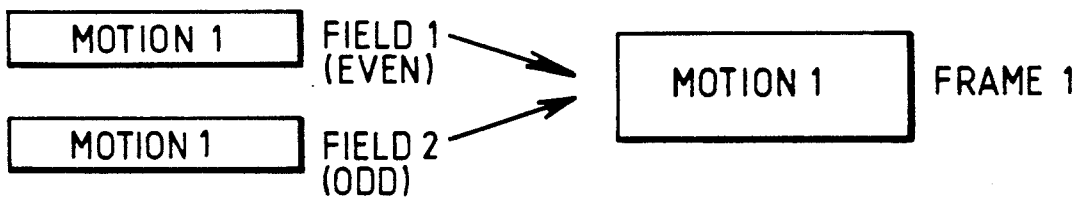
FIG. 4 shows the motion sequence required in an embodiment of the present invention.
Figure 4:
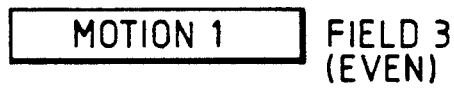
Figure 4:
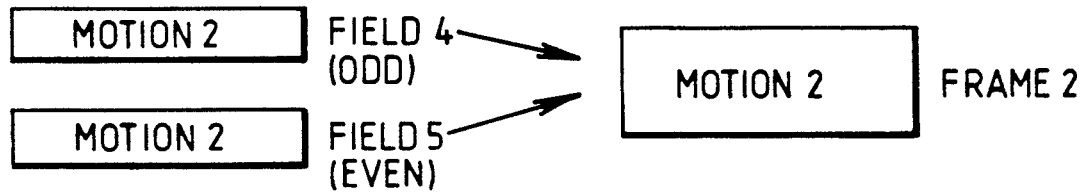
Figure 4:
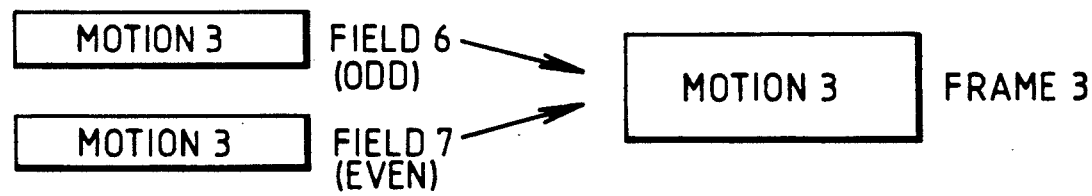
Figure 4:
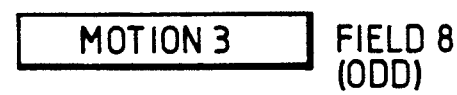
Figure 4:
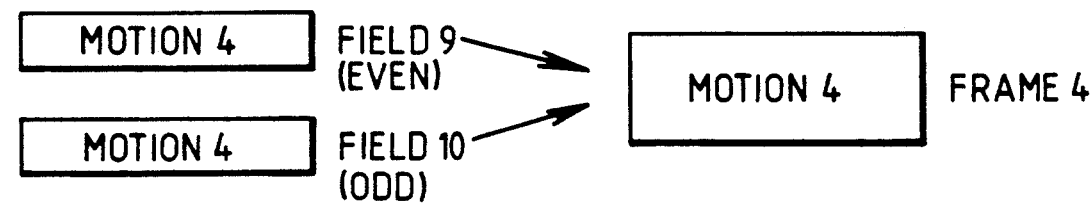

The motion characteristics produced by circuits in the post-production equipment are modified so as to form the correct motion sequence in the output after dropping the phantom fields. This is illustrated in FIG. 4 which shows the motion sequence from the 10-field video sequence to the final sequence of four film frames. The 10-field sequence is the same as that shown in FIG. 2, fields 3 and 8 being the phantom fields. The motion in fields 1, 2 and 3, all of which are derived from frame 1, is the same, and is referred to as motion 1. This must correspond to motion 1 in the output frame 1. Likewise, motion 2 in fields 4 and 5 derived from input frame 2 must correspond to output frame 2, motion 3 in fields 6 and 7 derived from input frame 3 must correspond to output frame 3, and motion 3 in fields 8, 9 and 10 derived from input frame 4 must correspond to output frame 4.

At the stage of 60 Hz 2:1 interlace format video to 24 Hz 1:1 format film transfer, the phantom frames must be recognized and dropped from the video sequence. It is particularly to be noted that equipment processing delays must be taken into account when using or passing on the 10-field video sequence identifier, and this is preferably done by having each circuit in the post-production equipment modify the 10-field video sequence identifier according to its own processing delay.

The overall result is that post-produced video is seen at the correct speed with adequate motion rendition; adequate here meaning that the motion rendition is similar to that achieved now by 3 2 3 2 pull down in a telecine. An important point so far as the producer is concerned, is that the video can be seen at the correct speed. More importantly, the correct motion portrayal is produced on the resulting 24 Hz 1:1 format film, whereas without the measures outlined above, the motion portrayal would have become very unnatural.

The above results can be achieved merely by modification of those circuits of the post-production equipment which introduce motion of some sort into the picture. Circuits which do not introduce motion do not need any modification except to effect the necessary compensating delay in the 10-field video sequence identifier where necessary.

Figure 1:
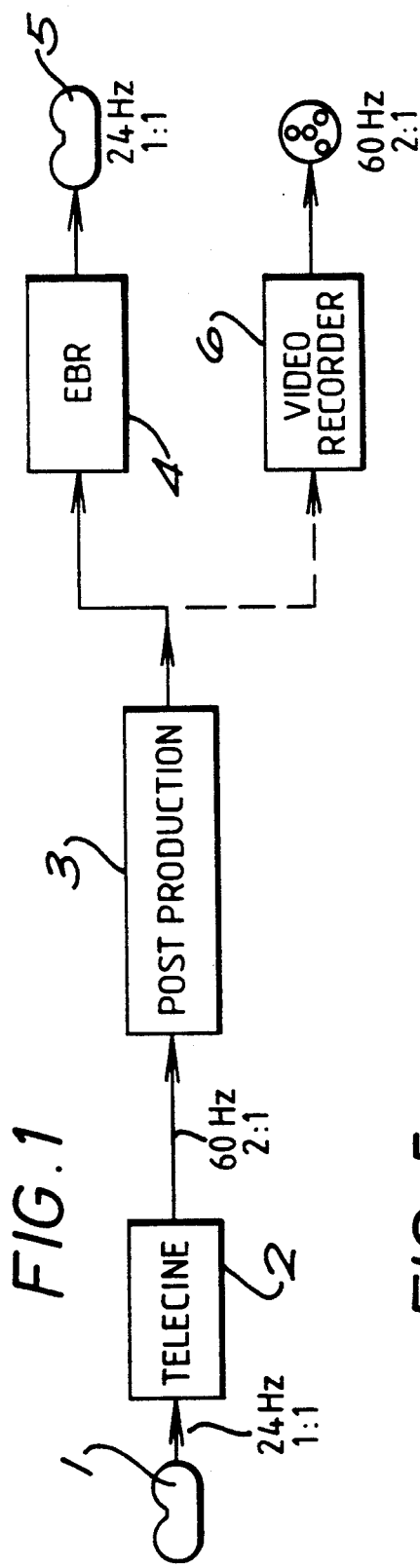
FIG. 1 shows in clock diagrammatic form equipment for post-production of material acquired on film.
Figure 5:
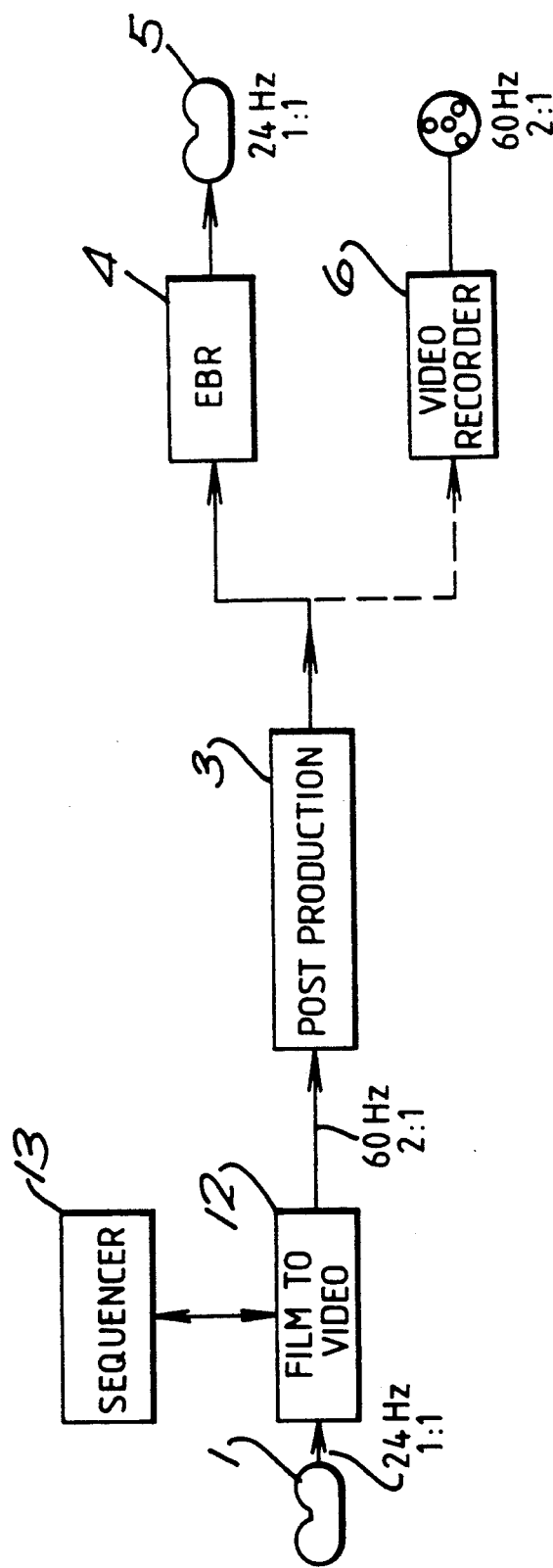
FIG. 5 shows an embodiment of apparatus according to the present invention in block diagrammatic form.

A specific embodiment will now be described with reference first to FIG. 5. The system is intended for video post-production of material which has been acquired on film and is to be distributed on film or video. 24 Hz 1:1 format 35 mm film material 1 is read by a film to video converter 12 to derive a 60 Hz 2:1 interlace format video signal. The converter 12 may, for example, be the HDTV (high definition television) 35 mm laser telecine produced by NAC Incorporated of Japan.

The converter 12 is modified by the provision of a sequencer 13 to produce the 10-field video sequence identifier and associate it with the output video signal. This can be done by supplying the output signal from the photo-multiplier arrangement which derives the video signal in the above-mentioned laser telecine to an array of field stores which are written in cyclically but are read to give the field sequence shown in FIG. 2. In particular the field stores are read to provide the 3 2 3 2 pull down in which fields from frame 1 and frame 3 are each read three times to provide the phantom fields at field 3 and field 8 in the field sequence. This is done by deriving a signal which indicates the current frame of the film, this signal controlling the reading of the fields and also generation of the 10-field video sequence identifier. The 10-field video sequence identifier is then written into an inactive portion of each field read from the field stores, so producing the required output modified video signal.

The 10-field video sequence identifier can, for example, simply mark the first field of a 10-field sequence, and this can be done by selecting one line in the inactive portion of each field and setting it to the peak white level in the first field and to black level in the other nine fields of the sequence. This is similar to a method used to identify the 8-field sequence in PAL video.

Alternatively the 10-field video sequence identifier can use a modified time code. The standard time code identifies specific frames of video in terms of hours, minutes, seconds and frames from a predetermined start point. Such a time code can readily be converted into a frame count from the start point by multiplying the counts for hours, minutes and seconds by 108000, 1800 and 30 respectively, summing the results, and adding this sum to the frame number to give a final sum which is the required frame count. By taking the modulo-5 value of the frame count, specific frames corresponding to a 10-field sequence in the video signal can be identified. Again, a similar method is used to identify the 8-field sequence in PAL video.

Other forms of 10-field video sequence identifier are of course possible and one example is a relatively complex signalling scheme such as video indexing. Moreover, it is not essential for the converter 12 to use 3 2 3 2 pull down as described above, as alternatives such as 3 2 2 3 pull down are possible with the consequential changes to the phantom fields and the motions.

The video signal with the 10-field video sequence identifier is supplied to a post-production unit 3. This may, for example, be the high definition digital video effects unit HDE-10K HDVS DME developed by Sony Corporation of Japan. This unit is capable of a wide range of 3-dimensional effects. For present purposes it is only necessary to mention translation of scale and rotation of the picture about any of three axes, because these effects introduce motion into the picture.

Figure 6:
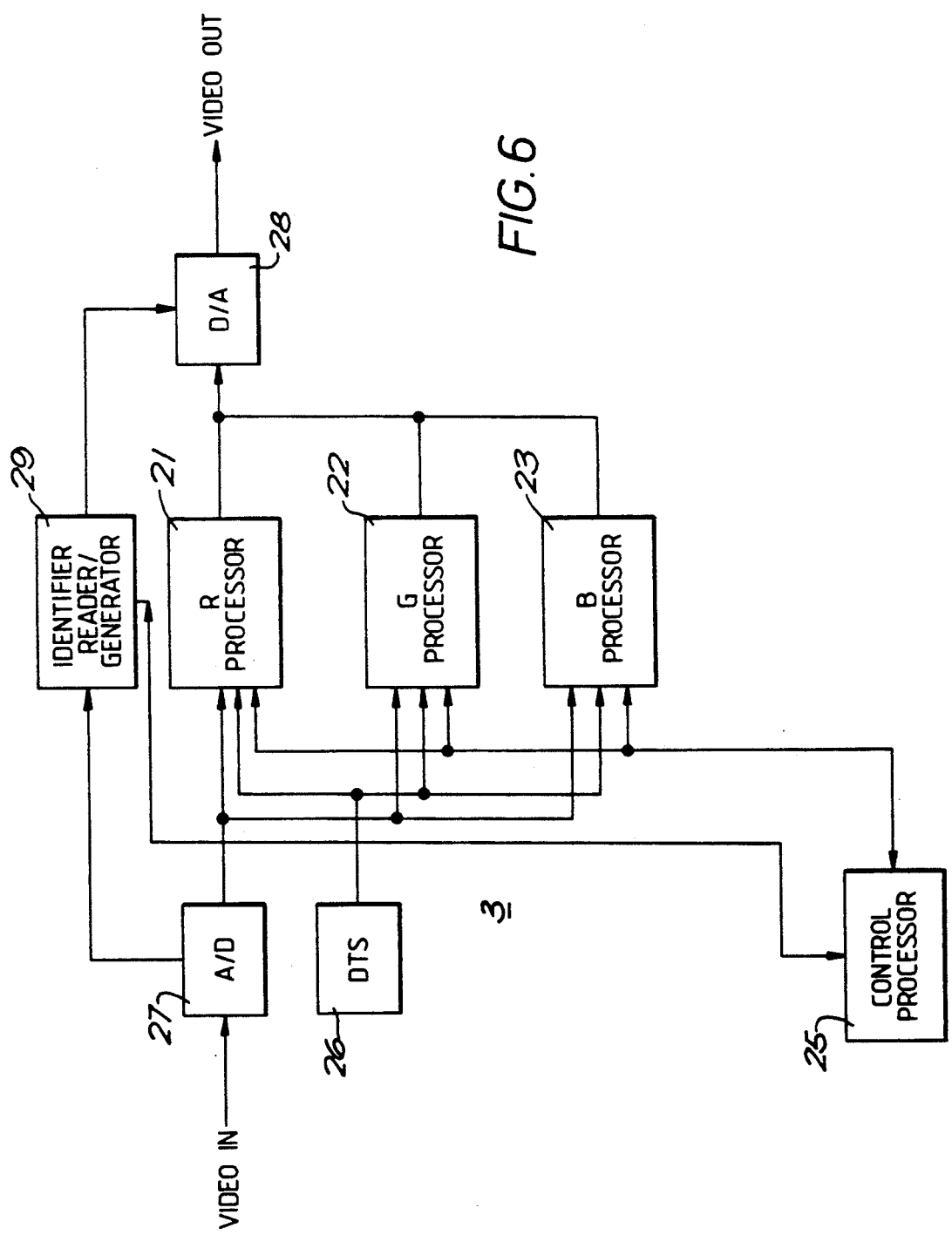
FIGS. 6 and 7 show parts of the embodiment in more detailed block diagrammatic form.

Referring to FIG. 6, the unit 3 comprises three identical signal processors 21, 22 and 23 for manipulation of the R, G and B signals respectively. The processors 21 to 23 are controlled via a high speed link from a control processor 25, which is a high speed personal computer system, to provide both effects composition and real time control of the unit 3. A digital test source (DTS) 26 can provide a background image, while the input and output of the unit 3 are provided with analog-to-digital (A/D) and digital-to-analog (D/A) converters 27 and 28, respectively.

Assuming that the 10-field video sequence identifier is incorporated in the input video signal, it is extracted at the A/D converter 27 and supplied to an identifier reader and generator 29, the output of which is connected to the D/A converter 28. A two-way link connects the identifier reader and generator 29 to the control processor 25. Depending then on the effects called for by the control processor 25 and in particular on any motion of the image consequent on the effect selected, the control processor 25 causes the motion to be modified in dependence on the 10-field video sequence identifier. In addition, the 10-field video sequence identifier is modified in dependence on the processing delay, and the modified 10-field video sequence identifier is incorporated at the output video signal by the D/A converter 28.

Alternatively, if the 10-field video sequence identifier is merely associated with the input video signal, rather than incorporated therein, then it can be supplied directly or via an identifier reader and generator as appropriate to the control processor 25, and the modified 10-field video sequence identifier is then supplied directly by the control processor 25 or via the identifier reader and generator to be associated with the output video signal.

Thus in all cases the control processor 25 can read the 10-field video sequence identifier and hence determine the relationship between the video sequence and the 10-field video sequence, that is, what movement is required for the particular field being processed. The modified 10-field video sequence identifier is then generated. For example, if the processing delay in the unit 3 were four frames, then the 10-field video sequence identifier would need to be regenerated with a four frame offset.

Referring again to FIG. 5, the modified video signal is supplied to an electron beam recorder system 4 for recording as film material 5 in a 24 Hz 1:1 format, using a drop field technique. The modified video signal will in fact generally be supplied to a video recorder 6 for recording in 60 Hz 2:1 interlace format for subsequent reproduction in slow motion as it is preferred that the electron beam recorder system 4 operate in slow motion. The electron beam recorder system 4 may be as disclosed in a paper 'HDTV Electron Beam Recording' presented by Thorpe and Ozaki at the 129th SMPTE Technical Conference, Oct. 31 to Nov. 4, 1987.

Figure 7:
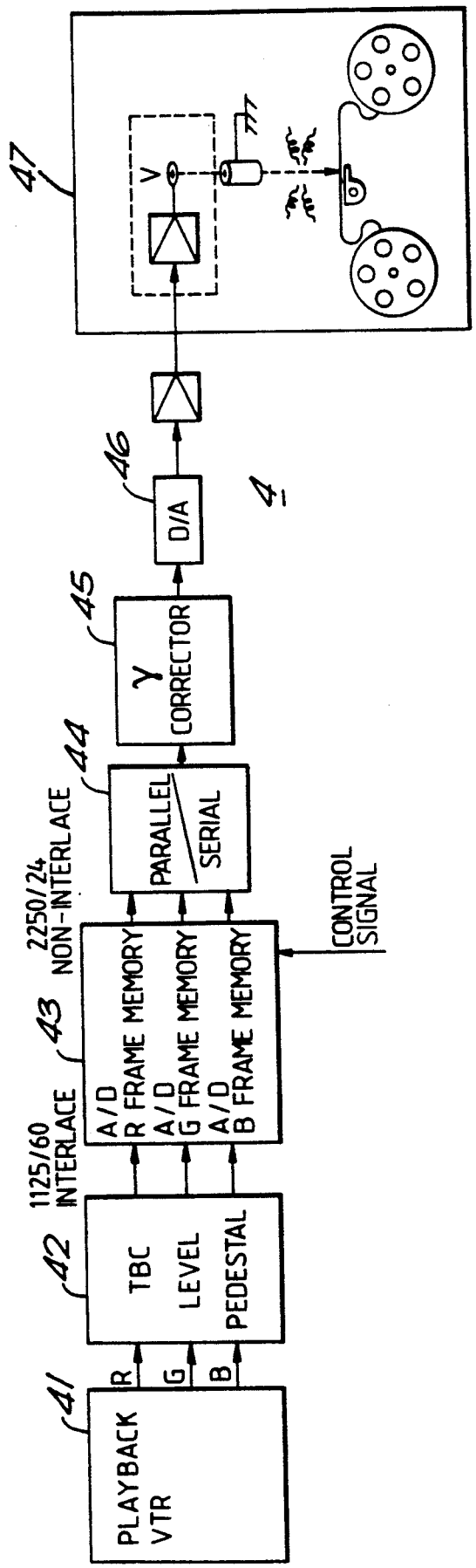

Thus as shown in FIG. 7, the electron beam recorder system 4 comprises a playback video tape recorder 41 which operates in slow motion at 1/30th speed. The front end processors comprise a pedestal and level adjuster 42, a frame memory unit 43, a parallel-to-serial converter 44, a gamma corrector 45, and a D/A converter 46.

When the equipment operates in 30 Hz (non-drop-field) mode, the actual electron beam recorder device 47 writes three frames of 2250 lines for each of the R, G and B in one second (1/30 of normal speed). The frames are recorded on black and white film, and therefore color pictures have to be written as frame sequential black and white separations.

The frame memory unit 43 is required to acquire complete frames of data from the interlaced input and to allow line doubling up to 2250 lines.

When operating in 24 Hz (drop-field) mode, the frame memory unit 43 is used to drop every fifth field simply by a control signal which inhibits writing of those data into memory. In 24 Hz mode the effective writing speed is reduced to one frame in 30/24 of a second.

The modification required to allow the phantom fields of the 3 2 3 2 pull down sequence to be dropped therefore simply involves synchronizing the writing of data into the frame memory unit 43 with the 10-field video sequence identifier, which is used to derive the control signal for the frame memory unit 43.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing film material, comprising the steps of:
    converting said film material to a video signal comprised of successive fields,
    associating a field sequence identifier with each of said fields of the video signal,
    motion processing said video signal in dependence on said field sequence identifier, thereby introducing a processing delay in said video signal, and
    modifying said field sequence identifier in dependence on said processing delay.

2. A method of transferring film material of a predetermined format to a video signal comprised of successive fields and then back to film of said predetermined format, comprising the steps of:
    converting said film material to said video signal with the addition of phantom fields being inherent in said converting;
    associating a sequence identifier with each of said fields of said video signal to indicate said phantom fields added during said converting of said film material;
    effecting motion processing of said video signal in dependence on said sequence identifier and with the introduction of a processing delay for providing a processed video signal;
    modifying said sequence identifier in dependence on said processing delay occurring during said motion processing of said video signal for providing a modified sequence identifier;
    converting said processed video signal to said predetermined format, including dropping said phantom fields indicated by said modified sequence identifier for providing a converted video signal; and
    recording said converted video signal on said film.

3. A method according to claim 2 wherein said sequence identifier comprises a result of one of modulo-5 or modulo-10 coding of a time code in said video signal.

4. A method according to claim 2 wherein said signal includes a blanking interval, and said sequence identifier comprises one of a marked line or data incorporated in said blanking interval of said video signal.

5. A method according to claim 2 wherein said video signal includes a time code, and said sequence identifier is based on said time code.

6. A method according to claim 2 wherein said predetermined format is 24 Hz 1:1 film format, and said converting uses 3232 pull down to provide said video signal with a 60 Hz 2:1 interlace format.

7. Apparatus for processing film material, comprising:
- means for converting said film material to a video signal comprised of successive fields,
- means for associating a field sequence identifier with each of said fields of the video signal,
- means for motion processing said video signal in dependence on said field sequence identifier, thereby introducing a processing delay in said video signal, and
- means for modifying said field sequence identifier in dependence on said processing delay.

8. Apparatus for transferring film material of a predetermined format to a video signal comprised of successive fields and then back to film of said predetermined format, the apparatus comprising:
- converting means for converting said film material to said video signal with the addition of phantom fields being inherent in said converting;
- coding means for associating a sequence identifier with each of said fields of said video signal to indicate said phantom fields added by said converting means;
- a motion processor for effecting motion processing of said video signal in dependence on said sequence identifier and with the introduction of a processing delay for providing a processed video signal;
- means for modifying said sequence identifier in dependence on said processing delay to provide a modified sequence identifier;
- means for converting said processed video signal to said predetermined format, and dropping said phantom fields indicated by said modified sequence identifier for providing a converted video signal; and
- recording means for recording said converted video signal on said film.

9. Apparatus according to claim 8 wherein said video signal includes a time code, and said coding means for associating said sequence identifier includes means for modulo-5 or modulo-10 coding of said time code in said video signal.

10. Apparatus according to claim 8 wherein said video signal includes a blanking interval, and said coding means for associating said sequence identifier includes means for incorporating one of a marked line or data in said blanking interval of said video signal.

11. Apparatus according to claim 8 wherein said video signal includes a time code, and said coding means bases said sequence identifier on said time code.

12. Apparatus according to claim 8 wherein said predetermined format is 24 Hz 1:1 film format, and said converting means for converting said film material employs 3 2 3 2 pull down to provide said video signal with a 60 Hz 2:1 interlace format.

* * * * *